US012785808B2

(12) United States Patent
Wu et al.

(10) Patent No.: US 12,785,808 B2
(45) Date of Patent: Nov. 3, 2026

(54) OPTICAL COMMUNICATION MODULE, DEVICE, AND SYSTEM

(71) Applicants: CHENGDU POWERVIEW SCIENCE AND TECHNOLOGY CO., LTD., Chengdu (CN); SHENZHEN SH-FIBER TECHNOLOGY CO., LTD., Shenzhen (CN)

(72) Inventors: Xiaohua Wu, Chengdu (CN); Xiaolong Li, Chengdu (CN); Fanghai Tang, Chengdu (CN); Ping Zhou, Chengdu (CN); Zijian Xiao, Chengdu (CN)

(73) Assignees: CHENGDU POWERVIEW SCIENCE AND TECHNOLOGY CO., LTD., Chengdu (CN); SHENZHEN SH-FIBER TECHNOLOGY CO., LTD., Shenzhen (CN)

( * ) Notice: Subject to any disclaimer, the term of this patent is extended or adjusted under 35 U.S.C. 154(b) by 229 days.

(21) Appl. No.: 18/719,867

(22) PCT Filed: Dec. 16, 2021

(86) PCT No.: PCT/CN2021/138951

§ 371 (c)(1),
(2) Date: Jun. 17, 2024

(87) PCT Pub. No.: WO2023/108575

PCT Pub. Date: Jun. 22, 2023

(65) Prior Publication Data

US 2025/0047387 A1 Feb. 6, 2025

(51) Int. Cl.

| | |
|---|---|
| ***H04B 10/27*** | (2013.01) |
| ***H04B 10/079*** | (2013.01) |
| ***H04B 10/40*** | (2013.01) |

(52) U.S. Cl.
CPC .......... *H04B 10/27* (2013.01); *H04B 10/079* (2013.01); *H04B 10/40* (2013.01)

(58) Field of Classification Search
None
See application file for complete search history.

(56) References Cited

U.S. PATENT DOCUMENTS

2009/0257744 A1* 10/2009 Yamamoto ............... H04J 3/14 398/22
2017/0288770 A1* 10/2017 Mentovich ......... H04B 10/0795

FOREIGN PATENT DOCUMENTS

CN 102164006 A * 8/2011
CN 208721839 U 4/2019

OTHER PUBLICATIONS

International Search Report for International application No. PCT/CN2021/138951, China National Intellectual Property Administration, mailed on Sep. 8, 2022, 5 pages including English Translation.

(Continued)

*Primary Examiner* — David W Lambert
(74) *Attorney, Agent, or Firm* — Bayramoglu Law Offices LLC

(57) ABSTRACT

An optical communication module, a device and a system are provided. The optical communication module includes: an electrical communication unit, an exchanging communication mainboard, a first optical transceiving unit and a second optical transceiving unit. The first optical transceiving unit and the second optical transceiving unit respectively receive an optical signal from and/or send an optical signal to a first device and a second device and complete conversion from or to the optical signal; and by the first optical transceiving unit and the second optical transceiving unit, devices connected with the electrical communication unit, (Continued)

the first device and the second device form a network that has a function of a self-healing ring network.

19 Claims, 8 Drawing Sheets

(56) References Cited

OTHER PUBLICATIONS

Written Opinion of the International Searching Authority for International application No. PCT/CN2021/138951, China National Intellectual Property Administration, mailed on Sep. 8, 2022, 7 pages including English Translation.

* cited by examiner

OPTICAL COMMUNICATION MODULE, DEVICE, AND SYSTEM

CROSS-REFERENCE TO RELATED APPLICATION

The present disclosure is a continuation application of an international application with the international filing number PCT/CN2021/138951 filed on Dec. 16, 2021, the contents of which are incorporated herein by reference in entirety.

TECHNICAL FIELD

The present disclosure relates to the technical field of optical communications, and specifically to an optical communication module, a device and a system.

BACKGROUND ART

Optical fiber communication has the advantages of excellent radio frequency interference (RFI) resistance, electromagnetic interference (EMI) resistance and excellent background noise resistance, and is increasingly applied in scenarios where wireless transmission is unsuitable and scenarios where wired copper cable transmission is interfered (such as power plants, power equipment inspection, under-mine communication).

An optical communication module is one of core devices of an optical fiber communication system, with a main function of implementing photoelectric conversion. In the above, a sending end of the optical communication module converts an electrical signal into an optical signal, and a receiving end converts an optical signal into an electrical signal. At present, the optical communication module is mainly composed of an optical emitting device, an optical receiving device, a signal processing unit, and a circuit interface.

In such optical communication module with two optical devices (the optical emitting device and the optical receiving device) and one circuit interface, two optical devices (the optical emitting device and the optical receiving device) can only separately realize an emitting or receiving function respectively, so that one optical communication module can only be connected with a single device, and transmit data of a single device connected therewith to a cloud server. However, in an actual optical fiber communication system, there are often many devices, and the devices need to form a network for performing data transmission. Such networking is usually complex, requires specialized networking device and network configuration, and has high construction and maintenance costs.

SUMMARY

Embodiments of the present disclosure provide an optical communication module, including: an electrical communication unit, an exchanging communication mainboard connected with the electrical communication unit, and a first optical transceiving unit and a second optical transceiving unit respectively connected with the exchanging communication mainboard, wherein the first optical transceiving unit is configured to receive an optical signal from and/or send an optical signal to a first device and complete conversion from or into the optical signal;

the second optical transceiving unit is configured to receive an optical signal from and/or send an optical signal to a second device and complete conversion from or into the optical signal;

the exchanging communication mainboard is configured to process data transmitted by the electrical communication unit, the first optical transceiving unit and the second optical transceiving unit; and by means of the first optical transceiving unit and the second optical transceiving unit, devices connected with the electrical communication unit, the first device and the second device are formed into a network.

In one or more embodiments, the exchanging communication mainboard includes: an optical exchanging module and a microprocessor, and wherein the optical exchanging module is configured to read the data transmitted by the electrical communication unit, the first optical transceiving unit and the second optical transceiving unit, and exchange and transmit the read data; and the microprocessor is configured to configure and monitor a working state of the optical exchanging module, monitor working states of the first optical transceiving unit and the second optical transceiving unit, and send monitoring results to an external device.

In one or more embodiments, the exchanging communication mainboard is further configured to monitor working states of the devices connected with the electrical communication unit.

In one or more embodiments, the exchanging communication mainboard is further configured to control, when the devices work abnormally, a transmission direction of a signal in various devices forming the network, so as to ensure that data of each device in the network is transmitted to the cloud server, thereby realizing network self-healing.

In one or more embodiments, the optical communication module further includes: a first optical fiber and a second optical fiber, wherein the first optical transceiving unit is configured to receive an optical signal from and/or send an optical signal to the first device through the first optical fiber and complete conversion from or into the optical signal; and the second optical transceiving unit is configured to receive an optical signal from and/or send an optical signal to the second device through the second optical fiber and complete conversion from or into the optical signal.

In one or more embodiments, the exchanging communication mainboard is further configured to monitor working states of the devices connected with the electrical communication unit.

In one or more embodiments, the exchanging communication mainboard is further configured to monitor working states of the first optical fiber, the second optical fiber and the devices connected with the electrical communication unit.

In one or more embodiments, the exchanging communication mainboard further includes:

a tester, configured to monitor working states of the first optical fiber, the second optical fiber and the devices connected with the electrical communication unit; and a microprocessor, further configured to send an alarm prompt when the tester monitors abnormal work.

In one or more embodiments, the working states include a normal working state and an abnormal working state, wherein when any one of the first optical fiber, the second optical fiber, and the devices connected with the electrical communication unit M4 has a failure/fault of open circuit, short circuit, cable impedance mismatch, connector breakdown, terminal mismatch or poor magnetism, it is determined to be in the abnormal working state.

In one or more embodiments, the first optical transceiving unit and the second optical transceiving unit are optical emitting-receiving assemblies having the same function, each formed by an optical emitter module, an optical receiving assembly, a splitter, an optical fiber and other assemblies, wherein the optical emitter module and the optical receiving assembly integrate reception and emission of a light source through a coaxial coupling process.

In one or more embodiments, the exchanging communication mainboard includes a memory and a power manager respectively connected with the microprocessor, wherein the memory is configured to store data received and generated by the optical communication module during working, and store data generated by operation of the microprocessor; and the power manager is configured to provide a working power supply for the optical communication module and manage the working power supply.

In one or more embodiments, the electrical communication unit is configured to transmit data between the exchanging communication mainboard and the devices connected with the optical communication module.

In one or more embodiments, the devices connected with the electrical communication unit are any modules or apparatuses that can monitor data in an optical fiber communication system.

In one or more embodiments, the first device is any one of an external device, equipment, a system or a network connected with the first optical transceiving unit, and the second device is any one of an external device, equipment, a system or a network connected with the second optical transceiving unit.

Embodiments of the present disclosure further provide a device internally provided with an optical communication module, including: a main casing and the above optical communication module, wherein the optical communication module is internally provided in the main casing.

In one or more embodiments, the main casing is further provided therein with a core module, and the optical communication module is fixed on the core module.

In one or more embodiments, the core module includes: a core module mainboard and a fixing mechanism provided on the core module mainboard, wherein the core module mainboard and the exchanging communication mainboard of the optical communication module share one mainboard, and the electrical communication unit of the optical communication module is a trace on the mainboard; alternatively, the exchanging communication mainboard of the optical communication module is fixed on the core module mainboard; and the electrical communication unit of the optical communication module is connected with the core module mainboard by a connector; and the fixing mechanism is configured to respectively fix the first optical transceiving unit and the second optical transceiving unit of the optical communication module.

In one or more embodiments, the main casing includes: a front casing assembly and a rear casing assembly, the rear casing assembly or the front casing assembly is provided thereon with optical fiber gates in positions corresponding to the first optical transceiving unit and the second optical transceiving unit respectively, and the first optical fiber and the second optical fiber are respectively inserted into the first optical transceiving unit and the second optical transceiving unit through the optical fiber gates.

In one or more embodiments, the device further includes: an optical fiber locking assembly, configured to lock an optical fiber after the optical fiber is inserted into the optical communication module, wherein outer surfaces of the main casing, the optical fiber gates, and the optical fiber locking assembly are designed to be waterproof, and the main casing, the optical fiber gates, and the optical fiber locking assembly are designed to be waterproof and sealed therebetween.

Embodiments of the present disclosure further provide a network system including a plurality of the above devices each internally provided with an optical communication module, wherein the network system further includes a cloud server, and the plurality of devices each internally provided with an optical communication module and the cloud server are connected by optical fibers between the optical communication modules to form a network.

In one or more embodiments, the optical communication module is further configured to monitor working states of an optical fiber connected with the optical communication module and the device internally provided with the optical communication module; and one optical exchanging module of the plurality of internally provided optical communication modules is configured to control data transmission between various devices each internally provided with an optical communication module according to the working states monitored by optical communication modules.

BRIEF DESCRIPTION OF DRAWINGS

In order to make clearer the technical problem to be solved by the present disclosure, the adopted technical means and the achieved technical effect, specific embodiments of the present disclosure will be described in detail below with reference to drawings. But it should be stated that the drawings described below are merely drawings of exemplary embodiments of the present disclosure, and those skilled in the art could obtain drawings of other embodiments according to these drawings, without using any inventive efforts.

DETAILED DESCRIPTION OF EMBODIMENTS

Figure 1:
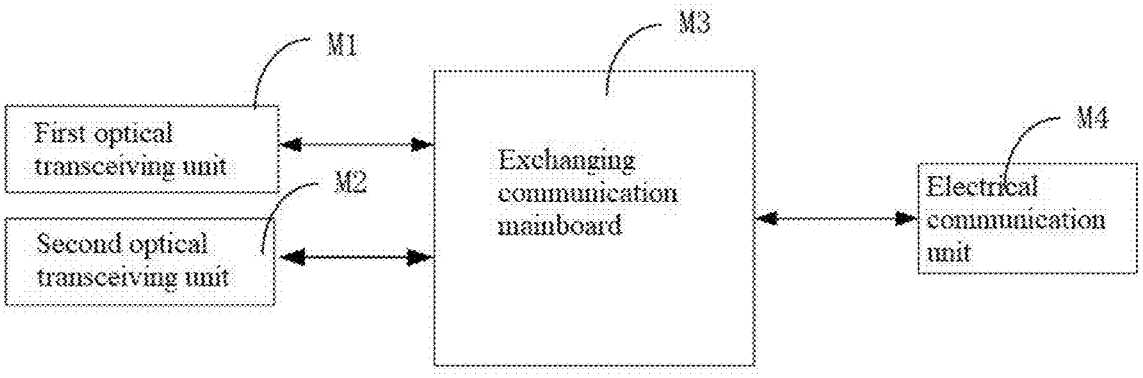
FIG. 1 is a schematic diagram of a structural framework of an optical communication module provided in one or more embodiments of the present disclosure.

Exemplary embodiments of the present disclosure will now be described more comprehensively with reference to the drawings. Although various exemplary embodiments can be implemented in many specific ways, the present disclosure should not be construed as being merely limited to the embodiments illustrated herein. On the contrary, these exemplary embodiments are provided to make contents of the present disclosure more complete, and facilitate conveying the concept of the disclosure fully to those skilled in the art.

On the premise of conforming to the technical concept of the present disclosure, structures, performances, effects or other characteristics described in a certain particular embodiment may be combined in one or more other embodiments in any suitable way.

In the process of introducing the embodiments, details of the structures, performances, effects or other characteristics are described for the purpose of making those skilled in the art be capable of fully understanding the embodiments. However, it is not excluded that those skilled in the art could implement the present disclosure with a technical solution that does not contain the above structures, performances, effects or other characteristics in a particular case.

A flow chart in the drawings is only an exemplary illustration of a flow, and does not represent that the solutions in the present disclosure must include all the contents, operations and steps in the flow chart, or represent that execution must be carried out in an order shown in the drawing. For example, some operations/steps in the flow chart may be decomposed, some operations/steps may be combined or partially merged, etc., and an execution order shown in the flow chart may be varied according to actual situations, without departing from the gist of the present disclosure.

A block diagram in the drawings generally represents functional entities, and does not necessarily correspond to physically independent entities. That is, functional entities may be implemented in a form of software, or these functional entities are implemented in one or more hardware modules or integrated circuits, or these functional entities are implemented in different networks and/or processor apparatuses and/or microcontroller apparatuses.

Like reference signs in respective drawings denote like or similar elements, components or parts, and thus repetitive descriptions of like or similar elements, components or parts may be omitted hereinafter. It should also be understood that, although attributes denoting serial numbers, such as first, second, and third, may be used herein to describe various devices, elements, components or parts, these devices, elements, components or parts should not be limited by these attributes. That is to say, these attributes are only used to distinguish one from another. For example, a first device may also be referred to as a second device, without departing from an essential technical solution of the present disclosure. Besides, the term "and/or" and "as well as/or" are meant to include any one or all combinations of more of listed items.

The present disclosure discloses an optical communication module, a device and a system. The optical communication module includes: a first optical transceiving unit, a second optical transceiving unit, an exchanging communication mainboard and an electrical communication unit, wherein the first optical transceiving unit and the second optical transceiving unit both may independently realize receiving a signal from and/or sending a signal to other devices, the first optical transceiving unit receives an optical signal from and/or sends an optical signal to a first device and completes conversion from or into the optical signal; the second optical transceiving unit receives an optical signal from and/or sends an optical signal to a second device and completes conversion from or into the optical signal; then by means of the first optical transceiving unit and the second optical transceiving unit, devices connected with the electrical communication unit, the first device and the second device may be formed into a network. The signals transmitted by the electrical communication unit, the first optical transceiving unit and the second optical transceiving unit are processed by the communication module mainboard, so as to meet the requirement of multi-device network transmission.

The devices in the present disclosure may be any modules or apparatuses that can monitor data in an optical fiber communication system, such as sensors, multi-element sensing apparatuses, and Internet of things (IoT) devices. In the above, the multi-element sensing apparatuses refer to apparatuses that can monitor and process a variety of signals, wherein the variety of signals include, but are not limited to, optical signals, electrical signals, audio and ultrasonic signals, electromagnetic signals, visual and hyper-visual signals, temperature and distribution thereof, etc. The optical communication module described in the present disclosure may be internally provided in the devices.

To sum up, in the present disclosure, by means of optical transceiving units having a function of independently implementing data signal reception and sending and photoelectric conversion, and the exchanging communication mainboard integrating multi-device optical signal exchanging processing, the complexity of networking engineering of homogeneous and heterogeneous devices is transformed into simple plug-and-play on an optical network bus, thereby omitting the design and construction of homogeneous and heterogeneous network, programming and networking devices and maintenance and operating costs, and rendering obvious engineering and industrial values.

Referring to FIG. 1, FIG. 1 is a schematic diagram of a structural framework of the optical communication module provided in the present disclosure. The optical communication module may transmit a signal (also referred to as data) collected by a device connected thereto to a cloud server, wherein the signal collected by the device is usually an electrical signal, and the optical communication module is responsible for converting the electrical signal collected by the device into an optical signal and transmitting the optical signal to the cloud server. As shown in FIG. 1, the optical communication module includes: a first optical transceiving unit M1, a second optical transceiving unit M2, an exchanging communication mainboard M3 connected with the first optical transceiving unit M1 and the second optical transceiving unit M2 respectively, and an electrical communication unit M4 connected with the exchanging communication mainboard M3, wherein:

The first optical transceiving unit M1 is configured to receive an optical signal from and/or send an optical signal to the first device and complete conversion from or into the optical signal;

The second optical transceiving unit M2 is configured to receive an optical signal from and/or send an optical signal to the second device and complete conversion from or into the optical signal;

The exchanging communication mainboard M3 is configured to process signals transmitted by the electrical communication unit M4, the first optical transceiving unit M1 and the second optical transceiving unit M2; and By means of the first optical transceiving unit M1 and the second optical transceiving unit M2, devices connected with the electrical communication unit M4, the first device and the second device form a network.

In the embodiments of the present disclosure, the first device is not limited to a device in a general sense, and it also may be any one of an external device, equipment, a system or a network connected with the first optical transceiving unit; the second device is not limited to a device in a general sense, and it also may be any one of an external device, equipment, a system, or a network connected with the second optical transceiving unit.

Figure 2A:
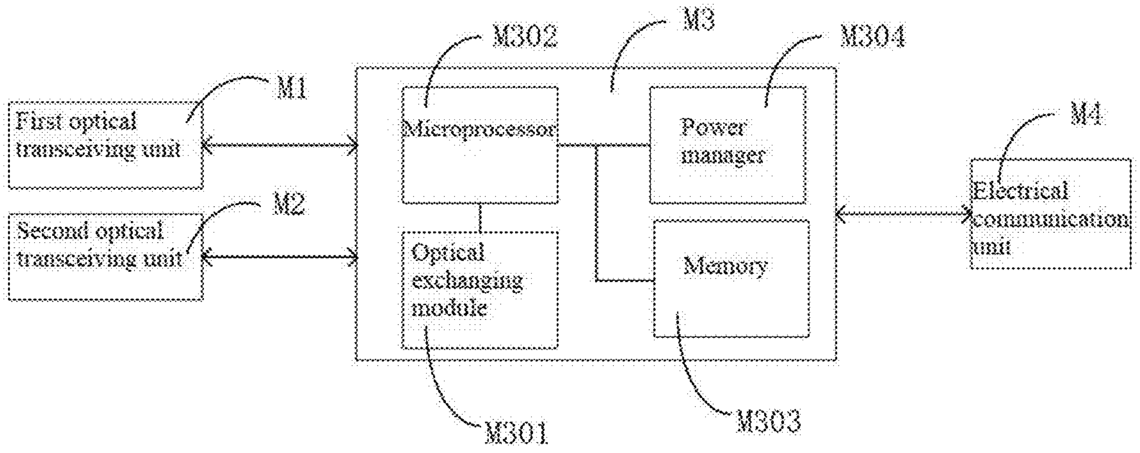
FIG. 2*a* is a schematic diagram of a structural framework of an optical communication module provided in one or more embodiments of the present disclosure.

In an embodiment, as shown in FIG. 2*a*, the first optical transceiving unit M1 and the second optical transceiving unit M2 may be optical emitting-receiving assemblies (Bi-Directional Optical Sub-Assembly, BOSA) having the same function, each formed by an optical emitter module (Transmitting Optical Sub-Assembly, TOSA), an optical receiving assembly (Receiving Optical Sub-Assembly, ROSA), a splitter, an optical fiber and other assemblies, wherein the optical emitter module and the optical receiving assembly integrate reception and emission (LD and PIN/APD) of a light source through a coaxial coupling process. In the above, the TOSA mainly completes conversion of an electrical signal into an optical signal, wherein the light source (a semiconductor light-emitting diode or a laser diode) is a core, an LD chip, a monitoring photodiode (MD) and other assemblies are packaged in a compact structure (TO coaxial package or butterfly package), and then the TOSA is formed. In a high data rate optical fiber module, PIN or ADP photodiode and TIA are typically assembled in a sealed metal case, so as to constitute the ROSA.

The first optical transceiving unit M1 and the second optical transceiving unit M2 in the present disclosure operate in devices connected therewith, and they may only receive, only send, or also may simultaneously receive and send signals. Taking the first optical transceiving unit M1 as an example, it may only receive the optical signal from the first device and convert the optical signal into the electrical signal, so as to complete the signal reception. The first optical transceiving unit M1 also may only receive the electrical signal from the electrical communication unit M4 and convert the electrical signal into the optical signal, and send the optical signal to the first device, so as to complete the signal sending. The first optical transceiving unit M1 also may receive the optical signal from the first device and convert the optical signal into the electrical signal, and meanwhile receive the electrical signal from the electrical communication unit M4 and convert the electrical signal into the optical signal, and send the optical signal to the first device, so as to simultaneously complete the signal reception and emitting. By means of the first optical transceiving unit M1 and the second optical transceiving unit M2, transmission of signals between a physical layer and a transmission medium may be realized.

In the present disclosure, an optical exchanging module is further integrated on the exchanging communication mainboard. Data transmitted by the electrical communication unit, the first optical transceiving unit and the second optical transceiving unit are read by the optical exchanging module, and the read data are exchanged and transmitted. A microprocessor configures and monitors a working state of the optical exchanging module, monitors working states of the first optical transceiving unit and the second optical transceiving unit, and sends monitoring results to an external device.

In one or more embodiments, the exchanging communication mainboard M3 may include: an optical exchanging module M301 and a microprocessor M302 connected with each other, wherein the optical exchanging module M301 is configured to read data transmitted by the electrical communication unit M4, the first optical transceiving unit M1 and the second optical transceiving unit M2, and exchange and transmit the read data. Exemplarily, the optical exchanging module M301 may use a gigabit multi-port exchanging chip.

The microprocessor M302 is configured to configure and monitor a working state of the optical exchanging module M301, monitor working states of the first optical transceiving unit M1 and the second optical transceiving unit M2, and send monitoring results to an external device. In the above, the external device may be: a cloud server, a central processor, or the like. Exemplarily, the microprocessor M302 may be implemented by a GD32 chip, wherein the GD32 is a 32-bit MCU, and is a 32-bit general microcontroller based on Arm Cortex-M3/M23/M4 kernel and RISC-V kernel. However, the present disclosure does not exclude embodiments of other devices having a digital processing function, for example, STM32, FPGA, DSP, and Marvell 88E1111 microprocessor. The microprocessor M302 may send the monitoring results to the external device through MODBUS.

In one or more embodiments, the exchanging communication mainboard M3 further may include: a memory M303 and a power manager M304 respectively connected with the microprocessor M302.

The memory M303 is configured to store data received and generated by the optical communication module during working, and is further configured to store data generated by operation of the microprocessor 302. The memory M303 may be implemented by any memory with reading and writing functions, such as NAND Flash Memory.

The power manager M304 is configured to provide a working power supply for the optical communication module and manage the working power supply.

In one or more embodiments, the exchanging communication mainboard M3 is further configured to monitor working states of devices connected with the electrical communication unit, so that a network system controls data transmission between various devices according to the working states. In this way, when a device works abnormally, a transmission direction of a signal in various networking devices is controlled, so as to ensure that data of each device in the network is transmitted to the cloud server, thereby realizing network self-healing. Exemplarily, the exchanging communication mainboard M3 may further include: a tester M305 (not shown in FIG. 2*a*) connected with the microprocessor M302, the memory M303 and the power manager M304 respectively, wherein the tester M305 can monitor the working states of the devices connected with the electrical communication unit, and wherein the working states may include: a normal working state and an abnormal working state. When a device connected with the electrical communication unit M4 has a failure of open circuit, short circuit, cable impedance mismatch, connector breakdown, terminal mismatch or poor magnetism, it is determined to be in the abnormal working state. The tester M305 specifically may be configured according to monitoring requirements of devices. For example, in a large outdoor wind power generation network, a virtual cable tester (VCT) may be used. The VCT remotely identifies potential cable failures using time domain reflectometry (TDR), so as to reduce device return and service calls. Potential wiring problems may be monitored by VCT, such as pair swap, pair polarity and excessive pair skew, as well as cable open circuit or any mismatches.

The electrical communication unit M4 is configured to transmit data between the exchanging communication mainboard M3 and the devices connected with the optical communication module. Exemplarily, the electrical communication unit M4 may use a 10/100/1000M self-adaptive electrical port unit to perform transmission in a form of FPC flexible printed circuit, and transmit data between the exchanging communication mainboard M3 and the devices connected with the optical communication module through a TCP/IP Ethernet protocol cluster. Certainly, the electrical communication unit M4 in the present disclosure further may be implemented in a serial communication mode such as RS485, RS232 and USB.

Figure 2B:
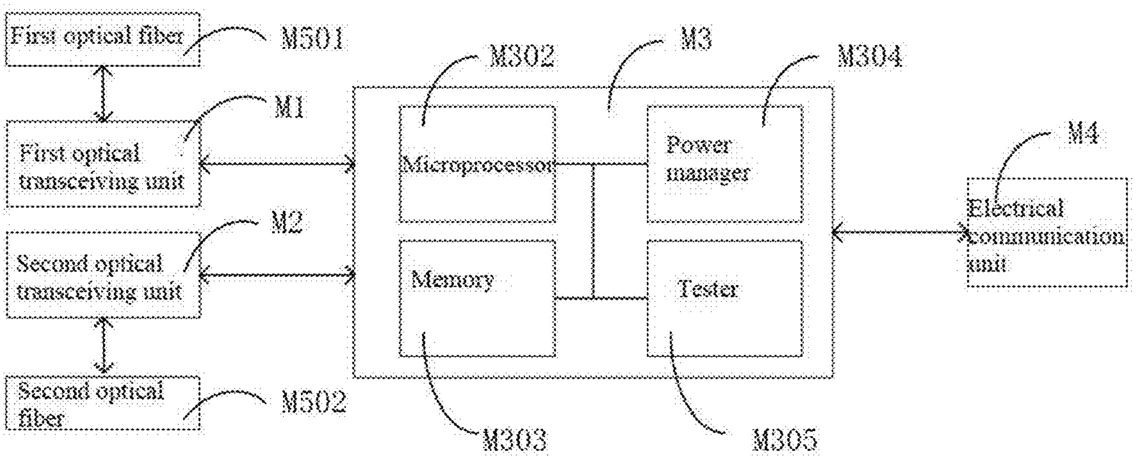
FIG. 2*b* is a schematic diagram of a structural framework of another optical communication module provided in one or more embodiments of the present disclosure.

In another embodiment, as shown in FIG. 2*b*, the optical communication module further includes: a first optical fiber M501 and a second optical fiber M502, wherein the first optical transceiving unit M1 receives an optical signal from and/or sends an optical signal to the first device through the first optical fiber M501 and completes conversion from or into the optical signal; and the second optical transceiving unit M2 receives an optical signal from and/or sends an optical signal to the second device through the second optical fiber M502 and completes conversion from or into the optical signal.

The exchanging communication mainboard M3 is further configured to monitor working states of the first optical fiber M501, the second optical fiber M502 as well as the devices connected with the electrical communication unit M4.

Exemplarily, as shown in FIG. 2*b*, the exchanging communication mainboard M3 may include: the microprocessor M302, the tester M305, the memory M303 and the power manager M304 connected with each other, as well as the optical exchanging module M301 (not shown in FIG. 2*b*) connected with the microprocessor M302.

The tester M305 is configured to monitor the working states of the first optical fiber M501, the second optical fiber M502 and the devices connected with the electrical communication unit M4. The working states may include a normal working state and an abnormal working state. When any one of the first optical fiber M501, the second optical fiber M502, as well as the devices connected with the electrical communication unit M4 has a failure of open circuit, short circuit, cable impedance mismatch, connector breakdown, terminal mismatch or poor magnetism, it is determined to be in the abnormal working state. When any optical fiber or device is detected to fail, it may be ensured by controlling the transmission direction of the signal in various networking devices, that data of each device in the network is transmitted to the cloud server, thereby realizing network self-healing, realizing a function of network self-healing while satisfying multi-device networking transmission, and realizing plug-and-play. The network and network expansion require only plug, which omits relevant network design, and intermediate devices and construction and maintenance costs.

In the above, the tester M305 may be configured according to actual needs, for example, in a large outdoor wind power generation network, a virtual cable tester (VCT) may be used. The VCT remotely identifies potential cable failures using time domain reflectometry (TDR), so as to reduce device return and service calls. Potential wiring problems may be monitored by VCT, such as pair swap, pair polarity and excessive pair skew, as well as cable open circuit or any mismatches.

The microprocessor M302 is further configured to send, when the tester M305 monitors abnormal work (namely, occurrence of failure), an alarm prompt to a data transmission control device of the network system, so that the data transmission control device controls data transmission between various devices according to the alarm prompt. Exemplarily, the data transmission control device of the network system may be a root optical exchanging module in a networking device, and then the root optical exchanging module controls a transmission direction of a signal in various networking devices according to the alarm prompt, so as to ensure data of each device in the network to be transmitted to the cloud server, thereby realizing the network self-healing. In the above, the root optical exchanging module is an optical exchanging module designated in advance from all optical exchanging modules of the networking devices.

Compared with the prior art, the present disclosure at least has the following beneficial effects:

1. In the present disclosure, by means of the optical transceiving units having a function of independently realizing signal reception and sending and the optical communication mainboard integrating multi-device signal processing, the complexity of networking engineering of heterogeneous devices is transformed into simple plug-and-play on the optical network bus, thereby omitting the design and programming of the networking network, as well as networking devices and construction and maintenance costs. The freely expanded network and network devices thereof have a huge engineering and industrial value.

2. In the present disclosure, data interfaces of various types of devices may be converted into optical communication interfaces inside the devices thereof, so as to directly access the optical network, which has wide applicability.

3. The present disclosure can realize the function of network self-healing, and omit relevant network designs for organizing a self-healing network, and intermediate devices and construction and maintenance costs.

4. An embedded optical communication module in the present disclosure can be plug-and-play, is simple and quick for networking, and may be expanded at will. The complexity of networking engineering of heterogeneous devices is transformed into simple plug-and-play on the optical network bus, requiring only plug. The freely expanded network and network devices thereof have a huge engineering and industrial value.

It may be understood that, the optical exchanging module in the present disclosure may be set in the exchanging communication mainboard as in the above embodiments, or may be independently set outside the exchanging communication mainboard, which is not specifically limited in the present disclosure. Meanwhile, the optical transceiving units in the present disclosure are not merely limited to the first optical transceiving unit and the second optical transceiving unit, and a plurality of optical transceiving units may be set according to networking requirements, so as to receive and send signals of a plurality of different devices, and form network systems of different structures.

Figure 3A:
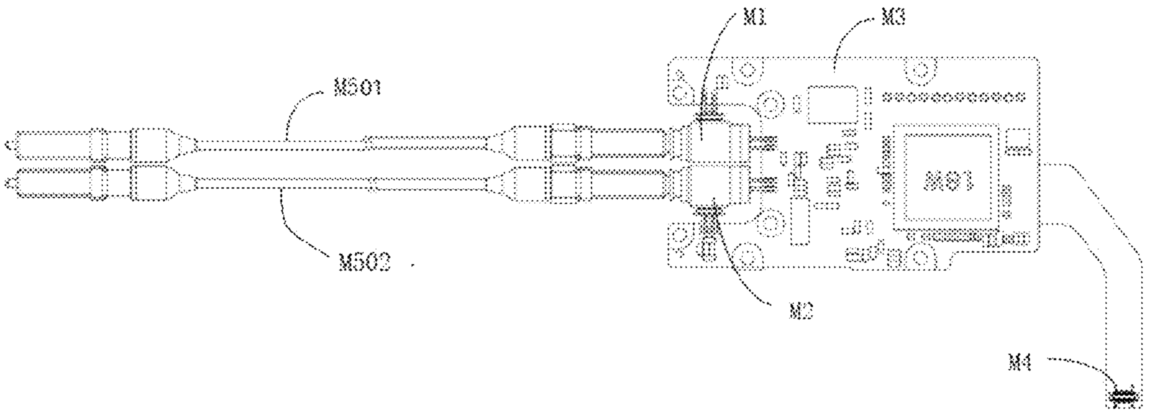
FIGS. 3*a*~3*c* are respectively a top view, a sectional view and a bottom view of a structural schematic diagram of a physical form of an optical communication module according to one or more embodiments of the present disclosure.
Figure 3B:
Figure 3C:
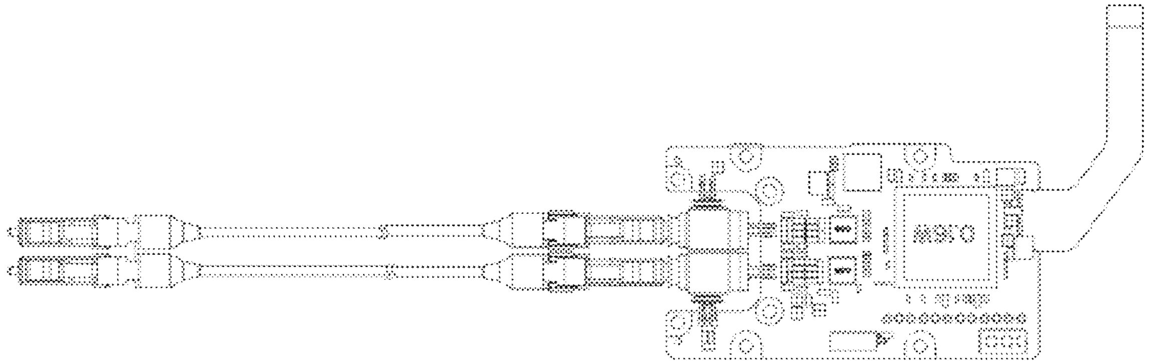

FIGS. 3*a*~3*c* are respectively a top view, a sectional view and a bottom view of a structural schematic diagram of a physical form of an optical communication module according to embodiments of the present disclosure. As shown in FIGS. 3*a*~3*c*, the optical communication module includes: a first optical transceiving unit M1, a second optical transceiving unit M2, an exchanging communication mainboard M3 connected with one end of the first optical transceiving unit M1 and one end of the second optical transceiving unit M2, an electrical communication unit M4 connected with the exchanging communication mainboard M3, a first optical fiber M501 connected with the other end of the first optical transceiving unit M1, and a second optical fiber M502 connected with the other end of the second optical transceiving unit M2.

Physical connection modes of a transmitting die LD and a receiving die PD-TIA of BOSAs in the first optical transceiving unit M1 and the second optical transceiving unit M2 include, but are not limited to, a metal pin, FPC or the like, wherein a tail end includes, but is not limited to, tail end adaptation, and it also may be pigtail.

Various functional units of the exchanging communication mainboard M3 use a PCB board as a carrier. The exchanging communication mainboard M3 may be manufactured by an independent PCB board, and also may share one PCB board with a mainboard of the devices connected with the optical communication module, which is not specifically limited in the present disclosure.

The electrical communication unit M4 adopts a 10/100/1000M self-adaptive electrical port unit to perform transmission in a form of FPC flat cable. It may be a physical connection between a flexible printed circuit (FPC) board and a pair of 24-pin board-to-board connectors, a physical connection of cables or board to board, etc.

The first optical fiber M501 and the second optical fiber M502 may be single-core optical fibers, and an optical fiber connector of pigtail may be a PC optical fiber connector. The first optical fiber M501 and the second optical fiber M502 also may be dual-core and multi-core optical fibers, and an optical fiber connector of pigtail includes, but is not limited to, a PC optical fiber connector, an FC optical fiber connector, an SC optical fiber connector, an ST optical fiber connector or the like.

Figure 4:
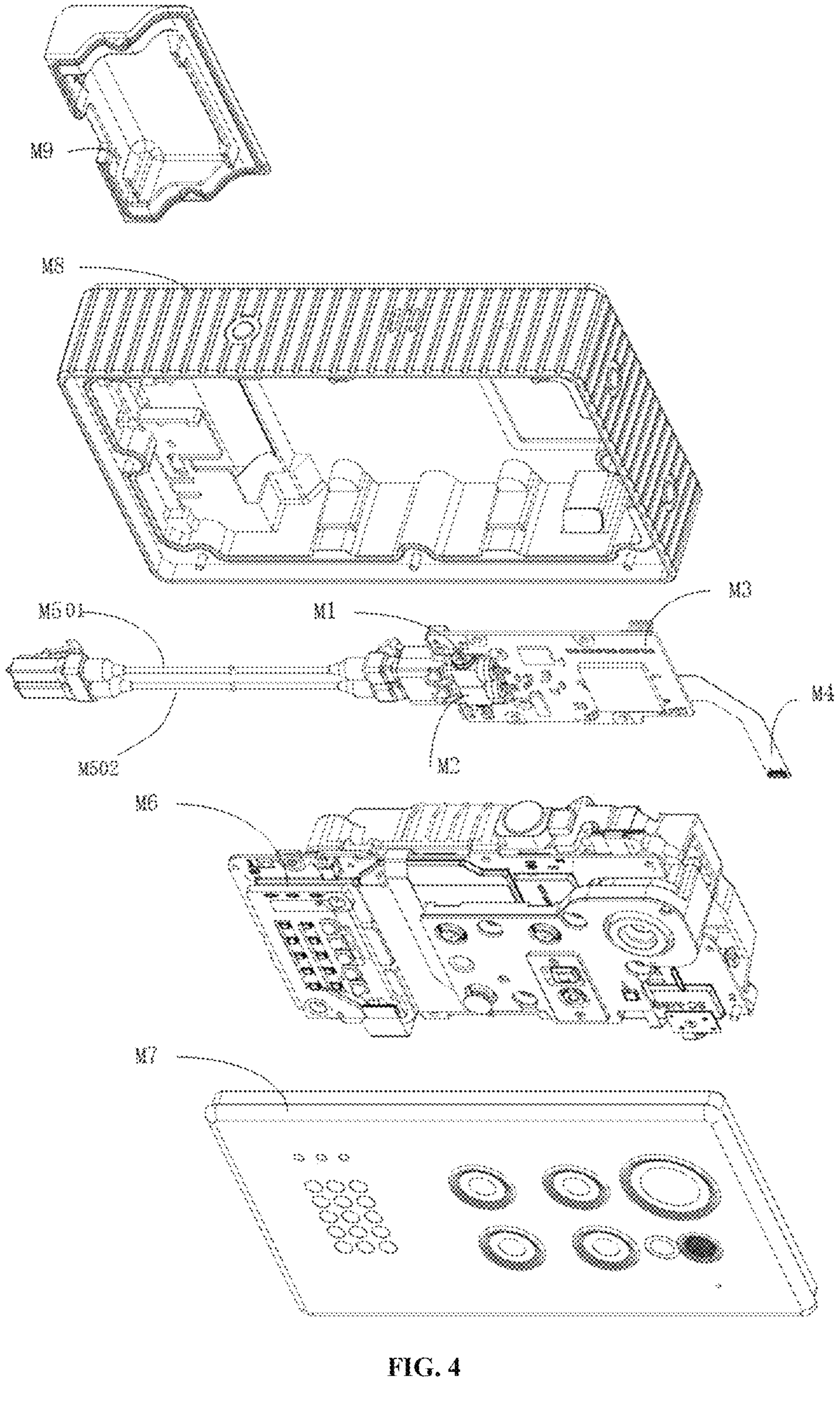
FIG. 4 is an exploded view of a device internally provided with an optical communication module according to one or more embodiments of the present disclosure.

Based on the above optical communication module, the present disclosure further provides a device internally provided with an optical communication module. Exemplarily, the device internally provided with an optical communication module may be: a sensor, a multi-element sensing apparatus, an Internet of things (Internet of things, IoT) device and so on. The device internally provided with an optical communication module includes: a main casing, and any one of the above optical communication modules internally provided in the main casing. FIG. 4 is an exploded view of a device internally provided with an optical communication module according to embodiments of the present disclosure. FIGS. 5*a*~5*f* are respectively a top view, a bottom view, a front view, a rear view and a right view of a device internally provided with an optical communication module according to embodiments of the present disclosure, and a schematic diagram of the device locking optical fibers.

Referring to FIG. 4 and FIGS. 5*a*~5*f*, the device internally provided with an optical communication module includes: a main casing, a core module M6, a first optical transceiving unit M1, a second optical transceiving unit M2, an exchanging communication mainboard M3, an electrical communication unit M4, a first optical fiber M501, a second optical fiber M502, and an optical fiber gate M9.

Exemplarily, the main casing may include: a front casing assembly M7 and a rear casing assembly M8, for mounting, fixing and protecting the core module M6 and the optical communication module M3, and meanwhile fixing the pigtails of the first optical fiber M501 and the second optical fiber M502 in the main casing.

The optical communication module may be fixed on the core module M6 in an assembling manner. In the above, the core module M6 includes: a core module mainboard and a fixing mechanism provided on the core module mainboard. In an example, the core module mainboard and the exchanging communication mainboard of the optical communication module share one mainboard, and the electrical communication unit of the optical communication module is a trace on the mainboard. In another example, the exchanging communication mainboard of the optical communication module is fixed on the core module mainboard; the electrical communication unit of the optical communication module is connected with the core module mainboard by a connector; and the fixing mechanism is used to respectively fix the first optical transceiving unit M1 and the second optical transceiving unit M2 of the optical communication module, so as to facilitate extraction and insertion as well as corresponding positioning of the optical fiber M501 and the optical fiber M502, and ensure that an optical signal can be correctly transmitted after the optical fibers are inserted.

Figure 5A:
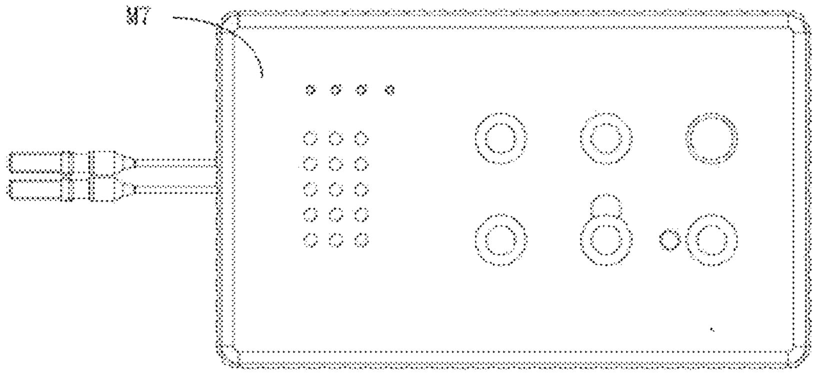
FIGS. 5*a*~5*e* are respectively a top view, a bottom view, a front view, a rear view and a right view of a device internally provided with an optical communication module according to one or more embodiments of the present disclosure.
Figure 5B:
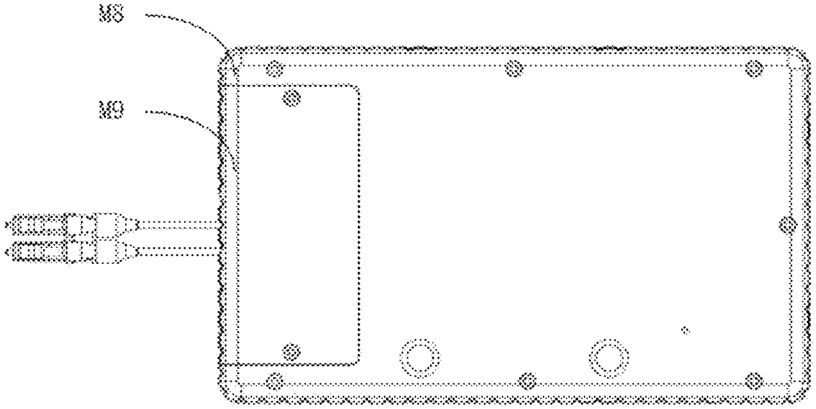
Figure 5C:
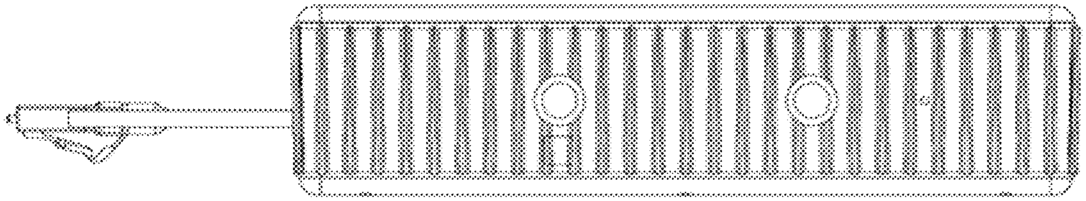
Figure 5D:
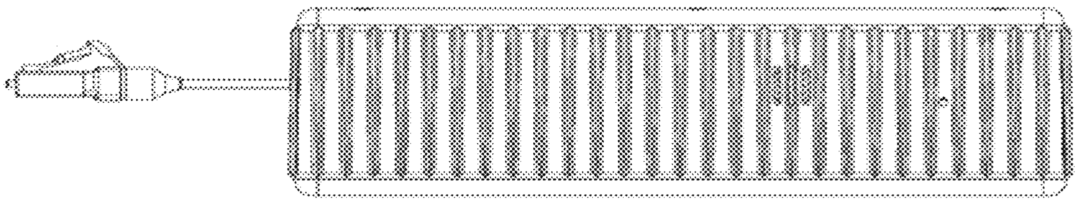
Figure 5E:
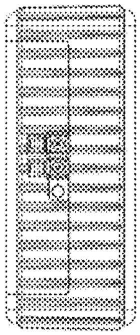
Figure 5F:
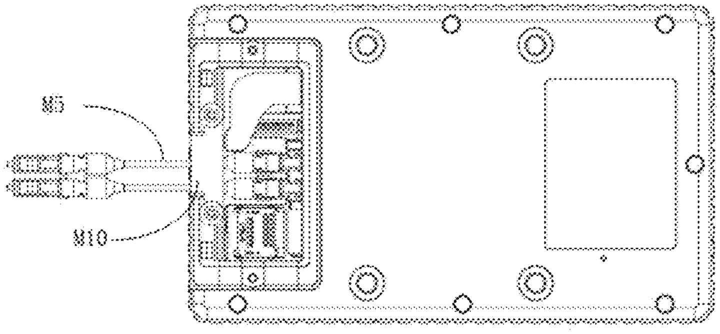
FIG. 5*f* is a schematic diagram of a device internally provided with an optical communication module according to one or more embodiments of the present disclosure, locking optical fibers.

In one or more embodiments, as shown in FIG. 5*f*, the rear casing assembly M8 is provided thereon with the optical fiber gates M9 respectively in positions corresponding to the first optical transceiving unit M1 and the second optical transceiving unit M2. The first optical fiber M501 and the second optical fiber M502 are respectively inserted into the first optical transceiving unit M1 and the second optical transceiving unit M2 through the optical fiber gates M9, so that it is convenient to extract and insert the optical fibers, and when an optical fiber is damaged or broken and needs to be replaced, it only needs to open the optical fiber gate to replace the optical fiber.

In one or more embodiments, as shown in FIG. 5*f*, the device further may include: an optical fiber locking assembly M10, for locking the optical fiber after the optical fiber is inserted into the optical communication module.

In one or more embodiments, in order to ensure that any device internally provided with an optical communication module in the above can work normally in harsh environments, outer surfaces of the main casing, the optical fiber gates M9, and the optical fiber locking assembly are designed to be waterproof, and the main casing, the optical fiber gates M9, and the optical fiber locking assembly are designed to be waterproof and sealed therebetween.

Exemplarily, IP67 standard waterproof and dustproof design may be performed in a host of the device internally provided with an optical communication module, and a fixing mechanism of a pigtail of an optical fiber M5 is provided in the host of the device internally provided with an optical communication module. Meanwhile, housings of the front casing assembly M7 and the rear casing assembly M8 are designed with a corresponding waterproof structure, and a waterproof silicone ring is added between the front casing assembly M7 and the rear casing assembly M8 to play a waterproof and dustproof sealing role, wherein the front casing assembly M7 and the rear casing assembly M8 may be locked and fixed by locking screws. Meanwhile, housings of the rear casing assembly M8 and the optical fiber gate M9 are also provided with corresponding waterproof structures, a waterproof silicone ring is added between the rear casing assembly M8 and the optical fiber gate M9 to play a waterproof and dustproof sealing role, and the rear casing assembly M8 and the optical fiber gate M9 may be locked and fixed by locking screws.

After the pigtail of the first optical fiber M501 or the second optical fiber M502 is inserted into the optical communication module, an optical fiber locking assembly M10 is mounted. The optical fiber locking assembly M10 is provided with a corresponding waterproof and dustproof structure, so as to ensure the waterproof and dustproof function after the optical fiber gate M9 and the rear casing assembly M8 are mounted, and meanwhile it also may prevent the optical fiber M5 from being easily pulled out by an external force from the host of the device internally provided with an optical communication module.

Based on the above device internally provided with an optical communication module, the present disclosure further provides a network system including the above device internally provided with an optical communication module. The network system may include: a plurality of devices each internally provided with an optical communication module and a cloud server, wherein the plurality of devices each internally provided with an optical communication module and the cloud server form a network through the optical communication modules. In the above, the devices each internally provided with an optical communication module may be mounted on a work site in a distributed manner, and adjacent devices each internally provided with an optical communication module may form a ring network using optical fibers. The number of devices each internally provided with an optical communication module forming the network is determined according to requirements of a construction site, and the number is not less than one.

Figure 6:
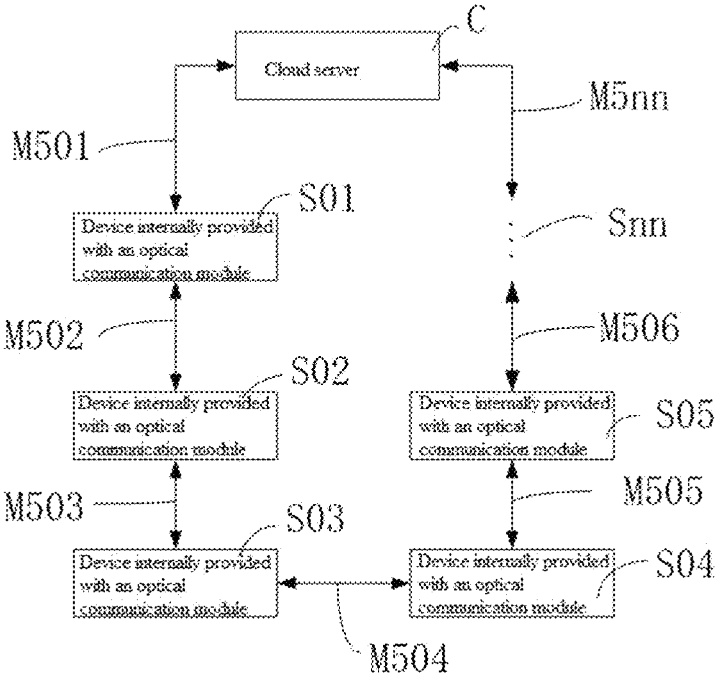
FIG. 6 is a schematic diagram of networking of a network system including devices each internally provided with an optical communication module according to one or more embodiments of the present disclosure.
Figure 7:
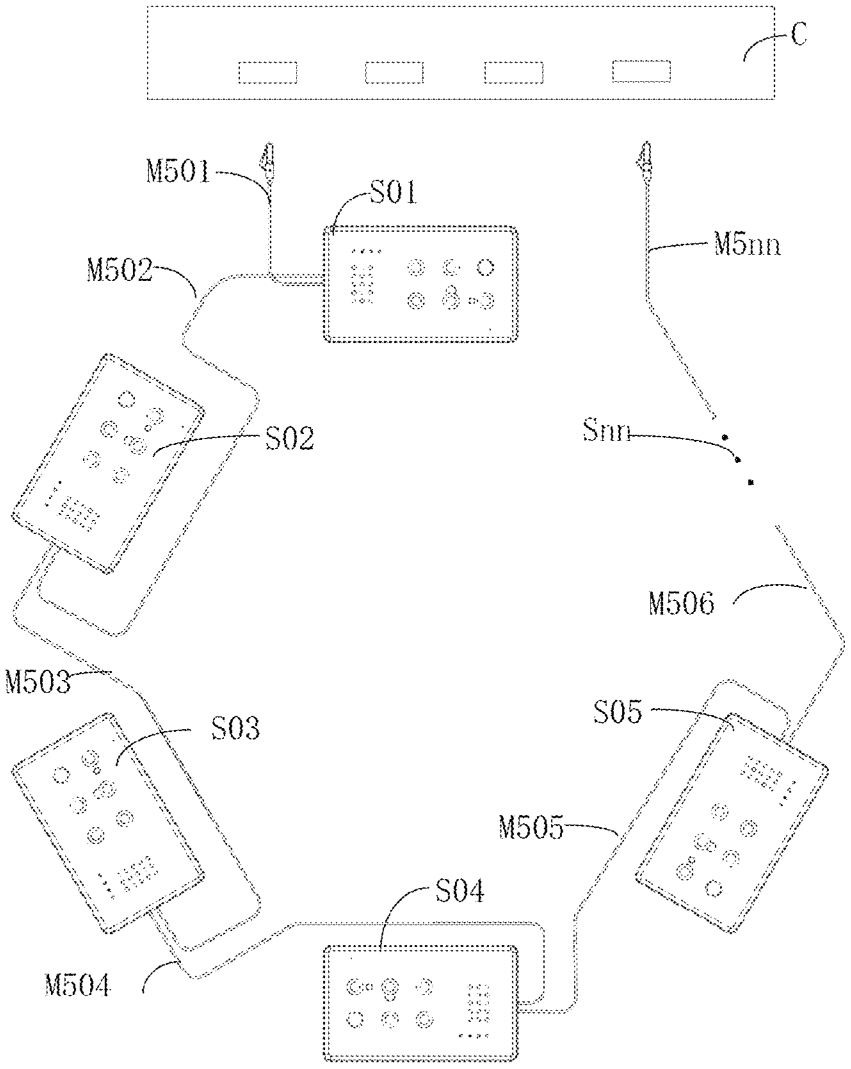
FIG. 7 is a schematic diagram of networking of a physical form of a network system including devices each internally provided with an optical communication module according to one or more embodiments of the present disclosure.

FIG. 6 is a schematic diagram of networking of a network system including the devices each internally provided with an optical communication module according embodiments of the present disclosure. FIG. 7 is a schematic diagram of networking of a physical form of a network system including the devices each internally provided with an optical communication module according to embodiments of the present disclosure. As shown in FIG. 6 and FIG. 7, a device S01 internally provided with an optical communication module is connected with the cloud server through an optical fiber M501, and is connected with a device S02 internally provided with an optical communication module through an optical fiber M502, the device S02 internally provided with an optical communication module is connected with a device S03 internally provided with an optical communication module through an optical fiber M503, the device S03 internally provided with an optical communication module is connected with a device S04 internally provided with an optical communication module through an optical fiber M504, the device S04 internally provided with an optical communication module is connected with a device S05 internally provided with an optical communication module through an optical fiber M505, the device S05 internally provided with an optical communication module is connected with a device S06 internally provided with an optical communication module through an optical fiber M505 . . . a device Snn internally provided with an optical communication module is connected with the cloud server through an optical fiber M5*nn*, so as to form a ring network. In the above, the optical communication modules M3 provided inside the devices S01~Snn each internally provided with an optical communication module not only receive and send data generated by the present device, but also receive and send data sent by adjacent devices each internally provided with an optical communication module through the optical exchanging module M301.

The network system including the devices each internally provided with an optical communication module in the embodiments of the present disclosure may be applied to data monitoring of wind driven generators. In the above, a plurality of devices S01~Snn each internally provided with an optical communication module are mounted in a distributed manner in different positions of the wind driven generator, such as a tower body, a gearbox, a generating set, a transmission shaft, and a blade, so as to form a ring network, for the purpose of acquiring data of different position coordinates at the same time point, such as sound signal, vibration frequency, amplitude, seismic source position coordinates, displacement, speed, acceleration, wind speed, temperature, humidity, atmospheric pressure value, light luminance, optical wavelength, high-definition image and video, thermal imaging image and video, 3D image and video, and millimeter-wave radar image, and transmitting the data to the cloud server through the ring network formed by the optical communication modules internally provided in various devices. The cloud server performs feature extraction on collected signals according to an intelligent algorithm, so as to obtain features such as a running state of an engine room, a running state of a wind wheel, a posture and a running state of a tower body, and a basic running state, so as to diagnose failures by model matching, and present an alarm to notify relevant personnel of overhaul and maintenance.

Figure 8:
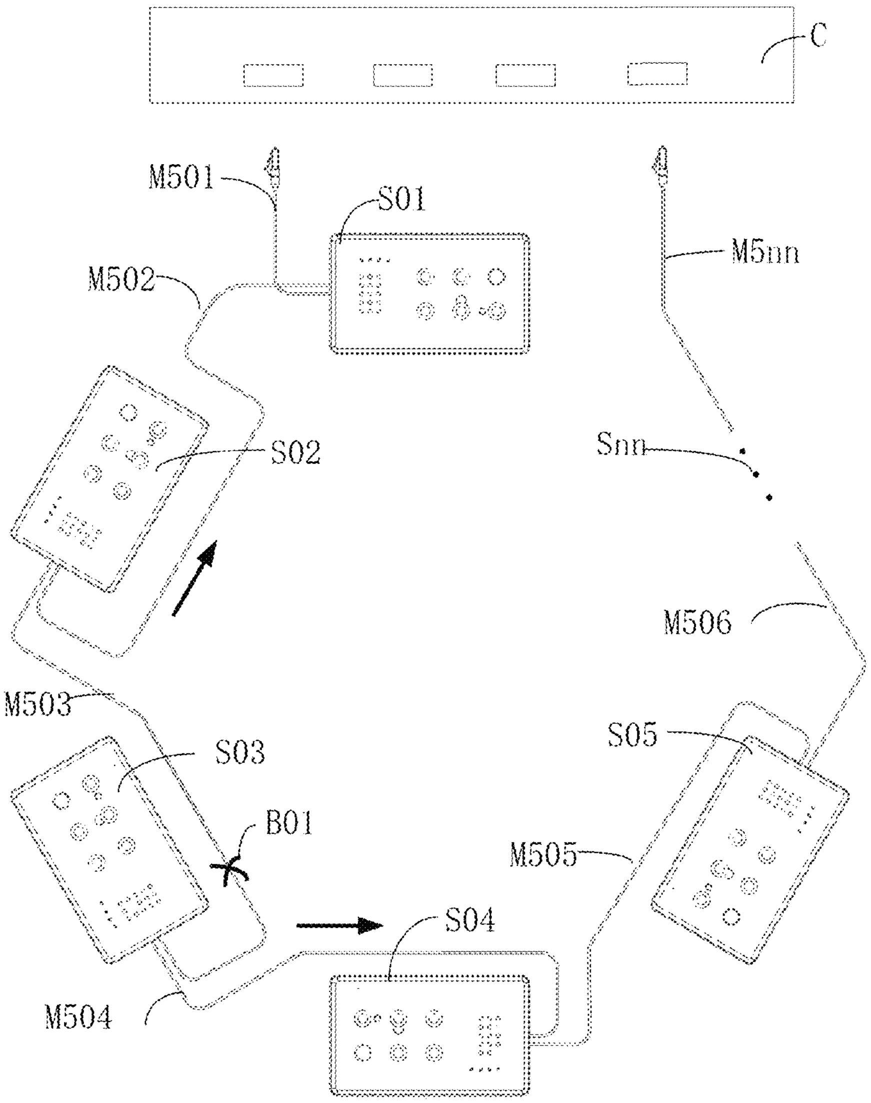
FIG. 8 is a schematic diagram of a physical structure of a network system implementing a self-healing ring according to one or more embodiments of the present disclosure.

During actual running of the devices each internally provided with an optical communication module, an optical cable, a connector and a terminal may have quality problems and mounting reliability problems. In the embodiments of the present disclosure, a virtual cable tester M304 included in the optical communication module M3 internally provided in the device internally provided with an optical communication module may monitor working states of the optical fibers, and connectors and terminals of the device internally provided with an optical communication module, so that failures including open circuit, short circuit, cable impedance mismatch, connector breakdown, terminal mismatch, poor magnetism and so on may be diagnosed. Based on this, the network system including the devices each internally provided with an optical communication module in the present disclosure, after networking, further may realize a function of self-healing ring. FIG. 8 is a schematic diagram of a physical structure of a network system realizing a self-healing ring according to embodiments of the present disclosure. In the above, the device S01 internally provided with an optical communication module is connected with S02 through the optical fiber M502, and is connected with a server C through the optical fiber M501. A virtual cable tester M304 of the optical communication module M3 internally provided in the device S01 internally provided with an optical communication module may detect and monitor working states of optical fibers, including M501 and M502, and connectors and terminals of the device S03 internally provided with an optical communication module. A root optical exchanging module is designated in advance in various optical exchanging modules forming the network, and data transmission between various devices each internally provided with an optical communication module is controlled according to the working states monitored by various optical communication modules by the root optical exchanging module.

Taking a connecting optical fiber M503 between the device S02 internally provided with an optical communication module and the device S03 internally provided with an optical communication module as an example, when the optical fiber M503 is broken, or the device S02 internally provided with an optical communication module connected with the optical fiber M503 or a connector or a terminal of S02 has a failure, such as open circuit, short circuit, cable impedance mismatch, connector breakdown, terminal mismatch and poor magnetism, the virtual cable tester M304 in the optical communication module M3 internally provided in the device S02 internally provided with an optical communication module detects abnormality, and the root optical exchanging module controls the data of the device S02 internally provided with an optical communication module to be transmitted to the cloud server C through the optical fiber M502, the device S01 internally provided with an optical communication module, and the optical fiber M501. Meanwhile, the assembly, the virtual cable tester M304, included in the optical communication module M3 internally provided in the device S03 internally provided with an optical communication module, detects the abnormality, and the network system controls the data of the device S03 internally provided with an optical communication module to be transmitted to the cloud server C through the optical fiber M504, the multi-element sensing terminal S04, the optical fiber M505, the device S05 internally provided with an optical communication module, the optical fiber M506 . . . the optical fiber M5*nn*.

Those skilled in the art could understand that various modules in the above device embodiments might be distributed in the device according to the description, and also might be correspondingly changed and distributed in one or more devices different from that in the above embodiments. The modules in the above embodiments may be combined into one module, and also may be further split into a plurality of sub-modules.

Based on the above network system, embodiments of the present disclosure further provide a data transmission method based on the above optical communication module (namely, a data transmission method applied to the above network system), wherein the network system includes a plurality of optical communication modules and a cloud server, the optical communication modules and the cloud server form a ring network through optical fibers, and each optical communication module is internally provided in a device internally provided with an optical communication module. The method includes:

S1, monitoring, by the optical communication module, whether working states of a device internally provided with an optical communication module and optical fibers connected with the optical communication module are normal;

S2, controlling, if the optical communication module monitors that the working state of the device internally provided with an optical communication module or any optical fiber connected with the optical communication module is abnormal, the optical communication module to transmit data of the device internally provided with an optical communication module connected with the optical communication module to an adjacent optical communication module or the cloud server through another optical fiber in a normal working state; and S3, controlling, if the optical communication module does not monitor that the working state of the device internally provided with an optical communication module or any optical fiber connected with the optical communication module is abnormal, the optical communication module to transmit data of the device internally provided with an optical communication module connected with the optical communication module to an adjacent optical communication module or the cloud server through any optical fiber.

Figure 9:
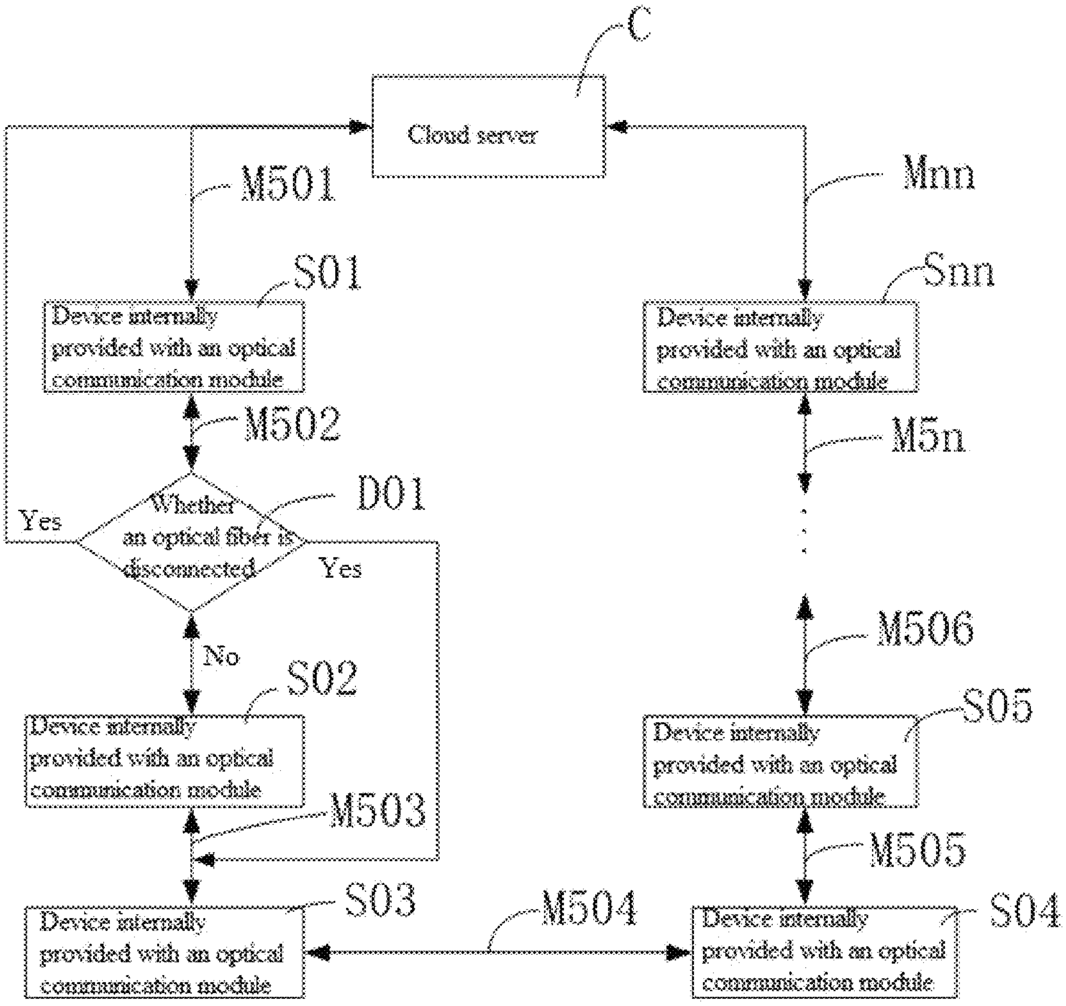
FIG. 9 is a schematic flow chart of a data transmission method based on an optical communication module according to one or more embodiments of the present disclosure.

The data transmission method based on an optical communication module in embodiments of the present disclosure is described below by taking the network system shown in FIG. 9 as an example. The network system in FIG. 9 includes: optical fibers M501, M502, M503, M504, M505, M506, and M5*n*~M5*nn*, for connecting the cloud server and the devices each internally provided with an optical communication module, or interconnecting the devices each internally provided with an optical communication module, wherein a physical form thereof may be an optical fiber line. Devices internally provided with an optical communication modules are S01, S02, S03, S04, and S05~Snn, wherein:

the cloud server may perform feature extraction on signals collected by a plurality of devices each internally provided with an optical communication module according to an intelligent algorithm, so as to obtain features such as a running state of an engine room, a running state of a wind wheel, a posture and a running state of a tower body, and a basic running state, so as to diagnose failures by model matching, and present an alarm to notify relevant personnel of overhaul and maintenance. Meanwhile, a root optical exchanging module is designated in advance in various optical exchanging modules forming the network, and data transmission between various devices each internally provided with an optical communication module is controlled by the root optical exchanging module according to the working states monitored by various optical communication modules.

During actual running of the devices each internally provided with an optical communication module, an optical cable, a connector and a terminal may have quality problems and mounting reliability problems. In the embodiments of the present disclosure, the virtual cable tester M304 included in the optical communication module M3 internally provided in the device internally provided with an optical communication module may diagnose possible problems, including open circuit, short circuit, cable impedance mismatch, connector breakdown, terminal mismatch, poor magnetism and so on.

Taking open circuit of the optical fiber M502 as an example, when the virtual cable tester M304 included in the optical communication module M3 internally provided in the device internally provided with an optical communication module detects the open circuit of the optical fiber M502, the data of the device S01 internally provided with an optical communication module is controlled to be transmitted to the cloud server C through the optical fiber M501.

Meanwhile, the virtual cable tester M304 included in the optical communication module M3 internally provided in the device internally provided with an optical communication module also can detect open circuit of M502, and control the data of the device S02 internally provided with an optical communication module to be transmitted to the cloud server C through the optical fiber M503, the device S03 internally provided with an optical communication module, the optical M504, the device S04 internally provided with an optical communication module, the optical fiber M505, the device S05 internally provided with an optical communication module, and the optical fiber M506.

When the virtual cable tester M304 included in the optical communication module M3 internally provided in the device S01 internally provided with an optical communication module detects that the optical fiber M502 is normal, the data of the device S01 internally provided with an optical communication module may be transmitted through M502 to the device S02 internally provided with an optical communication module, and the data is transmitted to the cloud server C through the devices S03\S04\S05\Snn each internally provided with an optical communication module, and the data also may be directly transmitted to the server C through M501.

In the flow chart, the optical fiber M501, the optical fiber M502, the optical fiber M504, the optical fiber M505, the optical fiber M506, and the optical fiber M5*nn* all have such a data transmission process of a self-healing ring, which is not described redundantly one by one herein.

Based on the above method, embodiments of the present disclosure further provide an optical exchanging module. The optical exchanging module may be used as a root optical exchanging module of a network to execute the above data transmission method based on an optical communication module. By forming a data communication network of a self-healing ring by the optical exchanging module and an optical bus, a function of network self-healing is realized. That is, the optical exchanging module executes the data transmission method applied to the above network system, and the data communication network of a self-healing ring is formed by the optical exchanging module and the optical bus.

Embodiments of the present disclosure further provide a non-transitory computer readable storage medium, wherein the non-transitory computer readable storage medium stores one or more programs, and when the one or more programs are executed by a processor, the above data transmission method based on an optical communication module is implemented.

Through the above description of the embodiments, those skilled in the art could easily understand that the exemplary embodiments described in the present disclosure might be implemented by software or by software in combination with necessary hardware. Therefore, the technical solutions according to the embodiments of the present disclosure may be embodied in a form of a software product, and the software product may be stored in a computer readable storage medium (which may be a CD-ROM, a USB flash disk, a mobile hard disk, or the like) or on a network, and includes several instructions so as to make a data processing device (which may be a personal computer, a server, a network device, or the like) execute the above method according to the present disclosure.

The computer readable storage medium may include a data signal, with readable program codes embodied therein, propagated in baseband or as part of a carrier wave. Such a propagated data signal may take a variety of forms, including, but not limited to, electromagnetic signal, optical signal or any suitable combination thereof. The readable storage medium further may be any readable medium other than a readable storage medium and can send, propagate or transmit a program for use by or in connection with instruction execution electronic equipment, apparatus or device. The program codes embodied on the readable storage medium may be transmitted by any appropriate medium, including but not limited to wireless, wireline, optical fiber cable, RF, etc., or any suitable combination of the foregoing.

The program codes for executing the operations of the present disclosure may be written in any one or a combination of more of programming languages, including an object-oriented programming language such as Java and C++, and conventional procedural programming languages, such as the "C" programming language or similar programming languages. The program codes may execute entirely on users' computing device, partly on the users' device, as a stand-alone software package, partly on users' computing device and partly on a remote computing device, or entirely on a remote computing device or server. In scenarios involving a remote computing device, the remote computing device may be connected to the users' computing device through any type of network, including local area network (LAN) or wide area network (WAN), or may be connected to an external computing device (for example, connected through Internet using an Internet Service Provider).

The above embodiments further illustrate the objectives, the technical solutions and the beneficial effects of the present disclosure in detail. It should be understood that the present disclosure is not inherently related to any particular computer, virtual apparatus or electronic device, and various general-purpose apparatuses also may implement the present disclosure. The above are merely preferred embodiments of the present disclosure and are not intended to limit the present disclosure. Any modifications, equivalent replacements, improvements, etc., made within the spirit and principle of the present disclosure, shall be covered within the scope of protection of the present disclosure.

What is claimed is:

1. An optical communication module, comprising: an electrical communication unit, an exchanging communication mainboard connected with the electrical communication unit, and a first optical transceiving unit and a second optical transceiving unit respectively connected with the exchanging communication mainboard, wherein the first optical transceiving unit is configured to receive an optical signal from and/or send an optical signal to a first device and complete conversion from or to the optical signal;

the second optical transceiving unit is configured to receive an optical signal from and/or send an optical signal to a second device and complete conversion from or to the optical signal;

the exchanging communication mainboard is configured to process data transmitted by the electrical communication unit, the first optical transceiving unit and the second optical transceiving unit; and devices connected with the electrical communication unit, the first device and the second device are formed into a network by the first optical transceiving unit and the second optical transceiving unit, wherein the exchanging communication mainboard comprises: an optical exchanging module and a microprocessor;

the optical exchanging module is configured to read the data transmitted by the electrical communication unit, the first optical transceiving unit and the second optical transceiving unit, and exchange and transmit the read data; and the microprocessor is configured to configure and monitor a working state of the optical exchanging module, monitor working states of the first optical transceiving unit and the second optical transceiving unit, and send monitoring results to an external device.

2. The optical communication module according to claim 1, wherein the exchanging communication mainboard is further configured to monitor working states of the devices connected with the electrical communication unit.

3. The optical communication module according to claim 1, further comprising: a first optical fiber and a second optical fiber, wherein the first optical transceiving unit is configured to receive the optical signal from and/or send the optical signal to the first device through the first optical fiber and complete conversion from or to the optical signal; and the second optical transceiving unit is configured to receive the optical signal from and/or send the optical signal to the second device through the second optical fiber and complete conversion from or to the optical signal.

4. The optical communication module according to claim 3, wherein the exchanging communication mainboard is further configured to monitor working states of the first optical fiber, the second optical fiber and the devices connected with the electrical communication unit.

5. The optical communication module according to claim 3, wherein the exchanging communication mainboard further comprises:

a tester, configured to monitor working states of the first optical fiber, the second optical fiber and the devices connected with the electrical communication unit; and a microprocessor, further configured to send an alarm prompt when the tester monitors abnormal work.

6. A device internally provided with an optical communication module, comprising: a main casing, and further comprising the optical communication module according to claim 1, wherein the optical communication module is internally provided in the main casing.

7. The device internally provided with an optical communication module according to claim 6, wherein the main casing is further provided therein with a core module, and the optical communication module is fixed on the core module.

8. The device internally provided with an optical communication module according to claim 7, wherein the core module comprises: a core module mainboard and a fixing mechanism provided on the core module mainboard, wherein the core module mainboard and the exchanging communication mainboard of the optical communication module share one mainboard, and the electrical communication unit of the optical communication module is a trace on the mainboard; or, the exchanging communication mainboard of the optical communication module is fixed on the core module mainboard; and the electrical communication unit of the optical communication module is connected with the core module mainboard by a connector; and the fixing mechanism is configured to respectively fix the first optical transceiving unit and the second optical transceiving unit of the optical communication module.

9. The device internally provided with an optical communication module according to claim 6, wherein the main casing comprises: a front casing assembly and a rear casing assembly, the rear casing assembly or the front casing assembly is provided thereon with optical fiber gates in positions corresponding to the first optical transceiving unit and the second optical transceiving unit respectively, and a first optical fiber and a second optical fiber are respectively inserted into the first optical transceiving unit and the second optical transceiving unit through the optical fiber gates.

10. The device internally provided with an optical communication module according to claim 9, further comprising: an optical fiber locking assembly, configured to lock an optical fiber after the optical fiber is inserted into the optical communication module, and outer surfaces of the main casing, the optical fiber gates, and the optical fiber locking assembly are designed to be waterproof, and the main casing, the optical fiber gates, and the optical fiber locking assembly are designed to be waterproof and sealed therebetween.

11. A network system comprising a plurality of devices each internally provided with an optical communication module, wherein each of the plurality of devices is according to claim 6, the network system further comprises: a cloud server, wherein the plurality of devices each internally provided with an optical communication module and the cloud server are connected by optical fibers between the optical communication modules to form the network.

12. The network system according to claim 11, wherein the optical communication module is further configured to monitor working states of an optical fiber connected with the optical communication module and the devices each internally provided with the optical communication module; and one optical exchanging module of the plurality of internally provided optical communication modules is configured to control data transmission between various devices each internally provided with an optical communication module according to the working states monitored by the optical communication modules.

13. The optical communication module according to claim 2, wherein the exchanging communication mainboard is further configured to control, when the devices work abnormally, a transmission direction of a signal in devices forming the network, so as to ensure that data of each device in the network is transmitted to a cloud server, thereby realizing network self-healing.

14. The optical communication module according to claim 5, wherein the working states comprise a normal working state and an abnormal working state, wherein when any one of the first optical fiber, the second optical fiber, and the devices connected with the electrical communication unit has a failure of open circuit, short circuit, cable impedance mismatch, connector breakdown, terminal mismatch or poor magnetism, it is determined to be in the abnormal working state.

15. The optical communication module according to claim 1, wherein the first optical transceiving unit and the second optical transceiving unit are optical emitting-receiving assemblies having same function, each formed by an optical emitter module, an optical receiving assembly, a splitter, an optical fiber and other assemblies, wherein the optical emitter module and the optical receiving assembly integrate reception and emission of a light source through a coaxial coupling process.

16. The optical communication module according to claim 1, wherein the exchanging communication mainboard comprises a memory and a power manager respectively connected with the microprocessor, wherein the memory is configured to store data received and generated by the optical communication module during working, and store data generated by operation of the microprocessor; and the power manager is configured to provide a working power supply for the optical communication module and manage the working power supply.

17. The optical communication module according to claim 1, wherein the electrical communication unit is configured to transmit data between the exchanging communication mainboard and the devices connected with the optical communication module.

18. The optical communication module according to claim 1, wherein the devices connected with the electrical communication unit are any modules or apparatuses that can monitor data in an optical fiber communication system.

19. The optical communication module according to claim 1, wherein the first device is any one of an external device, equipment, a system or a network connected with the first optical transceiving unit, and the second device is any one of an external device, equipment, a system or a network connected with the second optical transceiving unit.

* * * * *